United States Patent [19]

Kotani et al.

[11] Patent Number: 5,401,797
[45] Date of Patent: Mar. 28, 1995

[54] HIGHLY ANTIOXIDANT OLEFINIC RESIN COMPOSITION

[75] Inventors: Kozo Kotani; Taiichi Sakaya, both of Osaka, Japan

[73] Assignee: Sumitomo Chemical Company, Limited, Osaka, Japan

[21] Appl. No.: 781,597

[22] Filed: Oct. 23, 1991

[51] Int. Cl.⁶ .................... C08K 3/32; C08K 5/05; C08K 5/13; C08K 5/34; C08K 5/51; C08K 5/36

[52] U.S. Cl. .................... 524/414; 524/96; 524/97; 524/99; 524/100; 524/102; 524/120; 524/128; 524/151; 524/153; 524/291; 524/386; 524/415; 524/155

[58] Field of Search ............ 524/414, 413, 415, 406, 524/120, 128, 99, 291, 81, 96, 100, 153, 92, 101, 110, 151, 386

[56] References Cited

U.S. PATENT DOCUMENTS

| | | | |
|---|---|---|---|
| 4,071,497 | 1/1978 | Dexter et al. | 524/289 |
| 4,404,301 | 9/1983 | Kubota et al. | 524/99 |
| 4,785,034 | 11/1988 | Gaku et al. | 524/99 |
| 4,822,833 | 4/1989 | Zappia et al. | 524/99 |
| 4,935,272 | 6/1990 | Leboeuf | 524/417 |
| 5,039,723 | 8/1991 | Haruna et al. | 524/99 |

FOREIGN PATENT DOCUMENTS

| | | |
|---|---|---|
| 0389640 | 10/1990 | European Pat. Off. |
| 0448096 | 9/1991 | European Pat. Off. |
| 0066551 | 6/1977 | Japan |
| 2185723 | 8/1987 | Japan |
| 1202698 | 8/1970 | United Kingdom |

OTHER PUBLICATIONS

Chemical Patent Index Documentation Abstracts Journal, Section A, Week 8946, Jan. 1, 1990, A0063, No. 89-333229/46, & DD-A-269035, Jun. 14, 1989, "Prepn. of Magnetic Audio, Video, or Computer Tapes–By Dispersing Magnetic Particles in Polymer Binder . . . ".
Patent Abstracts of Japan, vol. 12, No. 110, (C-486) (2957), Apr. 8, 1988 & JP-A-62-235353, Oct. 15, 1987, T. Ichihashi, et al., "Polyester Composition".
David Williams "Polymer Science and Engineering", Prentice-Hall, Inc. New Jersey, 1971, p. 17.

*Primary Examiner*—Tae H. Yoon
*Attorney, Agent, or Firm*—Birch, Stewart, Kolasch & Birch

[57] ABSTRACT

A highly antioxidant resin composition containing a resin, a solution of a hypophosphite compound in an organic solvent, a heat stabilizer and a hindered amine base weathering stabilizer, which has improved heat stability and weather resistance. The hypophosphite compound is preferably dissolved in a polyvalent alcohol having a molecular weight of not more than 50,000.

29 Claims, No Drawings

HIGHLY ANTIOXIDANT OLEFINIC RESIN COMPOSITION

BACKGROUND OF THE INVENTION

1. Field of the Invention

The present invention relates to a highly antioxidant resin composition. More particularly, the present invention relates to a highly antioxidant resin composition comprising a resin, a heat stabilizer and a hindered amine base weathering stabilizer and having good heat stability and weather resistance.

2. Description of the Related Art

The amount of resins which are used outdoors is increasing year by year. Such outdoor use resins are required to have weather resistance properties according to their application. To this end, various weathering stabilizers have been developed. Recently, hindered amine base weathering stabilizers, which are so-called hindered amine light stabilizers (HALS) are often used, since they can prevent decrease of the mechanical properties or change of color tone of the resin compositions when subjected to outdoor weathering much better than the conventional weathering stabilizers (cf. Japanese Patent Kokai Publication No. 86645/1984).

Since the weathering stabilizer cannot impart processing stability or heat stability to the resins, a heat stabilizer (e.g. hindered phenol base heat stabilizers, sulfur base heat stabilizers and phosphite ester base heat stabilizers) is generally added to the resin composition.

However, under certain conditions, the resin composition containing both the heat stabilizer and the hindered amine base weathering stabilizer may suffer from deterioration due to poor heat stability such as gellation or seizure during processing or discoloration after processing. Further, when exposed to the outdoor atmosphere, the resin composition may be degraded due to poor weather resistance such as a decrease of mechanical properties or changes of gloss or color tone. Accordingly, the conventional resin compositions are not satisfactory in both the heat stability and the weather resistance. Though the heat stability and the weather resistance may be improved to some extent by the addition of larger amounts of the heat stabilizer and the hindered amine base weathering stabilizer to the resin, the resin composition may be yellowed, or the heat stabilizer and/or the hindered amine base weathering stabilizer may bleed out on the surface so that the appearance of a molded article is deteriorated.

In particular, it is known that, when the hindered phenol base heat stabilizer and the hindered amine base weathering stabilizer are used in combination, the hindered phenol base heat stabilizer causes yellowing of the resin and the hindered amine base weathering stabilizer interferes with the antioxidant action of the hindered phenol base heat stabilizer.

SUMMARY OF THE INVENTION

An object of the present invention is to improve the heat stability and weather resistance properties of a highly antioxidant resin composition which comprises a resin, a heat stabilizer and a hindered amine base weathering stabilizer.

According to the present invention, there is provided a highly antioxidant resin composition comprising a resin, a solution of a hypophosphite compound in an organic solvent, a heat stabilizer and a hindered amine base weathering stabilizer.

DETAILED DESCRIPTION OF THE INVENTION

As the heat stabilizer to be used in the present invention, are exemplified hindered phenol compounds such as 2,6-dialkylphenol derivatives and 2-alkylphenol derivatives, sulfur-containing compounds having a thiol or thioether linkage containing a divalent sulfur atom, or compounds having a phosphite ester linkage containing a trivalent phosphorus atom.

Examples of the hindered phenol based heat stabilizer are the following compounds (1) to (8):

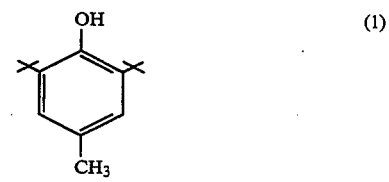

(1)

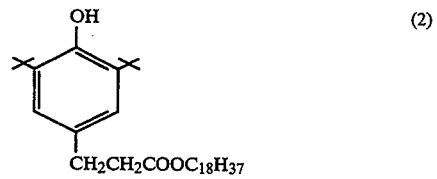

(2)

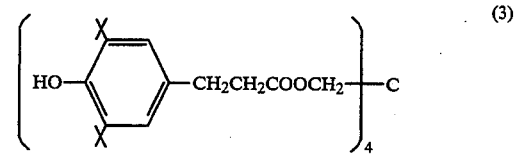

(3)

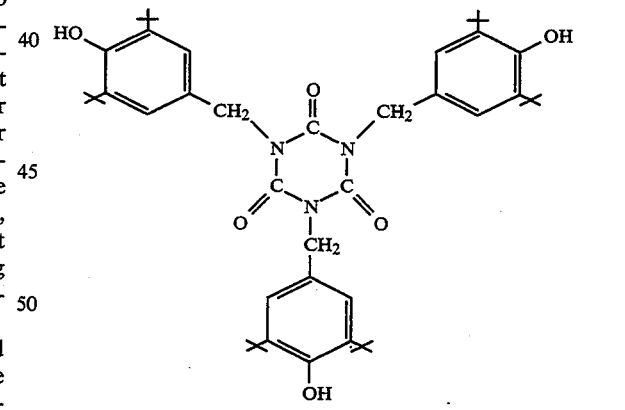

(4)

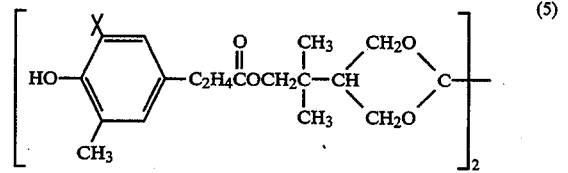

(5)

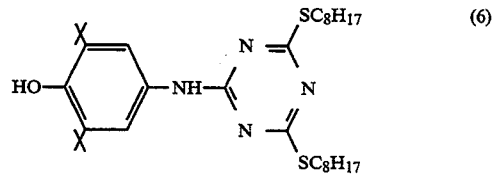

(6)

-continued
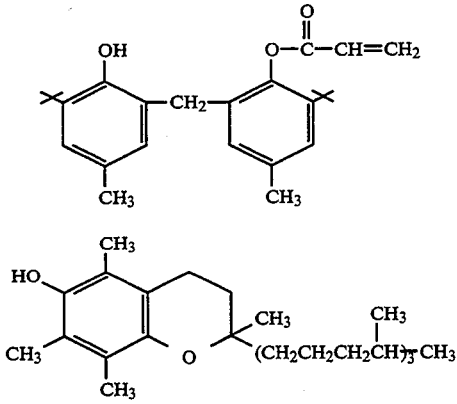
Examples of the sulfur-containing heat stabilizer are the following compounds (9)–(16):
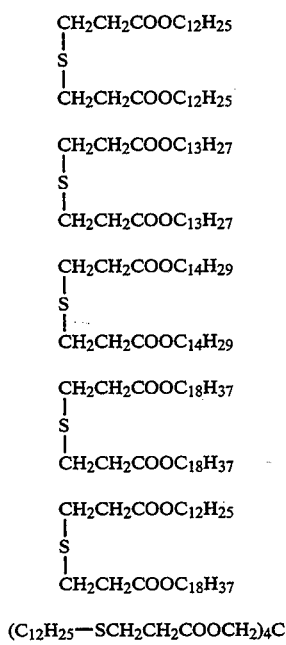
(C₁₂H₂₅—SCH₂CH₂COOCH₂)₄C (14)
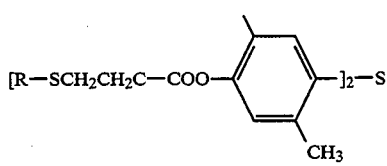
wherein R is an alkyl group having 12, 13 or 14 carbon atoms
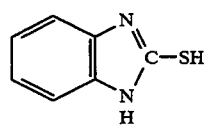
Examples of the phosphite ester base heat stabilizer are the following compounds (17) through (33):
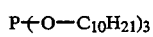
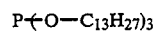
-continued
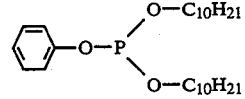
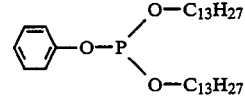
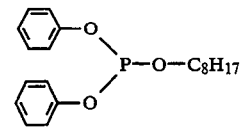
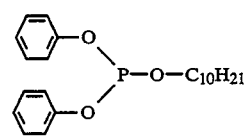
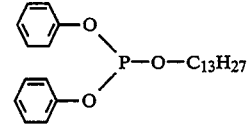
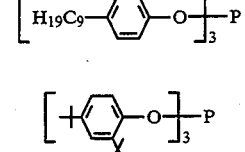
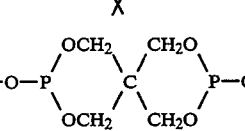
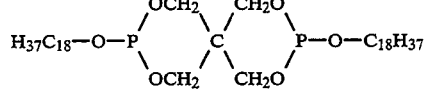
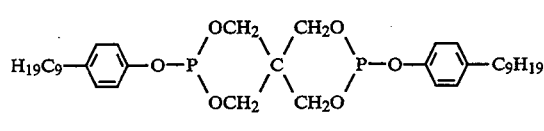
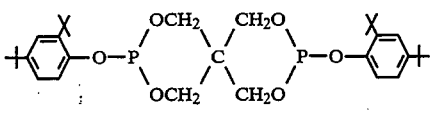
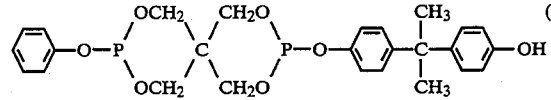
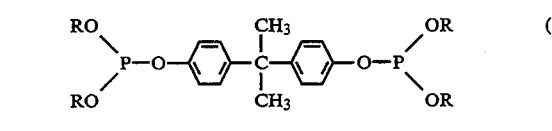
wherein R is an alkyl group having 12 through 15 carbon atoms
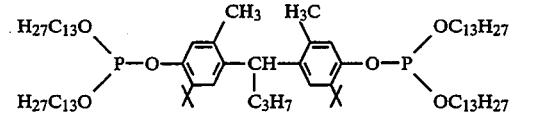

-continued

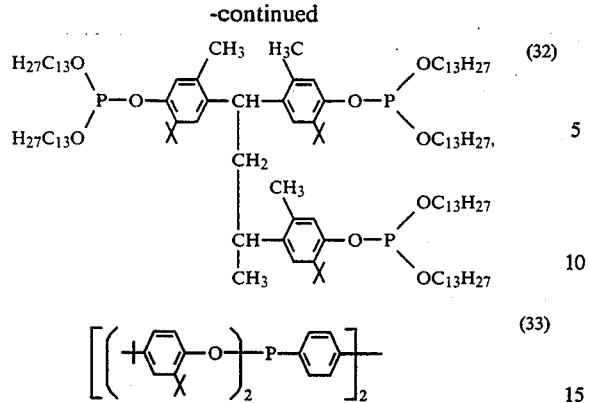

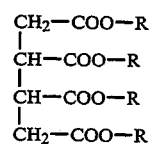

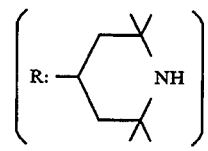

The above heat stabilizer may be used independently or as a mixture thereof.

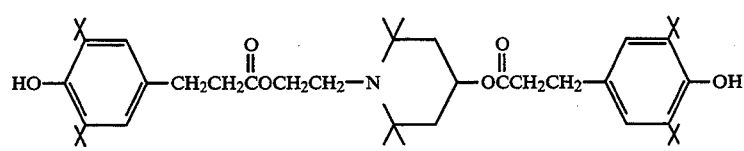

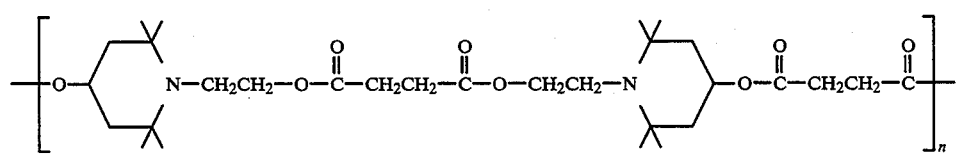

The hindered amine base weathering stabilizer is preferably a 2,2,6,6-tetraalkylpiperdine derivative having a substituent at the 4-position and a molecular weight of at least 250. As the substituent at the 4-position, are exemplified a carboxylic acid residue, an alkoxy group, an alkylamino group and the like. The N-position may be substituted with, for example, an alkyl group. Specific examples of the hindered amine base weathering stabilizer are the following compounds (34) through (41):

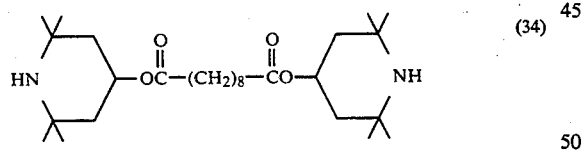

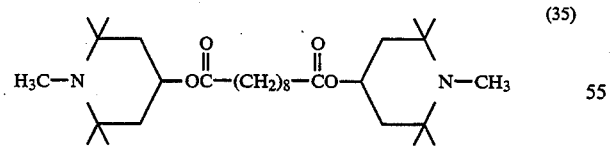

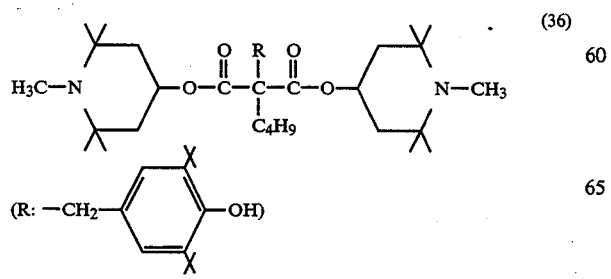

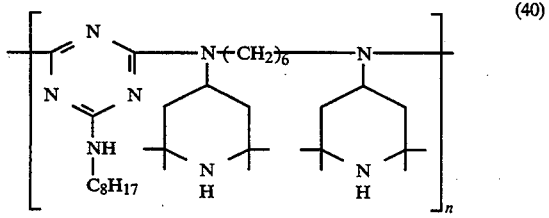

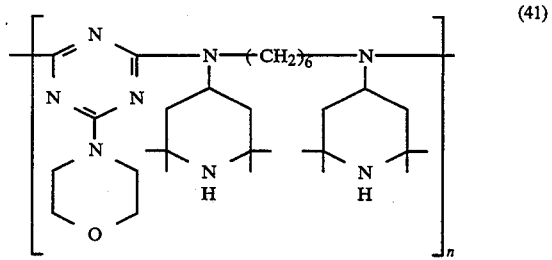

The hypophosphite compound to be used in the present invention is expressed by the formula (A):

$$X_a(H_2PO_2)_b \quad (A)$$

wherein X is a metal ion, an ammonium ion or a quaternary phosphonium ion, and a and b are positive numbers provided that they satisfy the equation: $a \times c = b$ in which c is the valency of X.

Specific examples of the compound (A) are lithium hypophosphite, sodium hypophosphite, potassium hypophosphite, magnesium hypophosphite, calcium hypophosphite, zinc hypophosphite, titanium hypophosphite, vanadium hypophosphite, molybdenum hypophosphite, manganese hypophosphite, cobalt hypophosphite, ammonium hypophosphite, butylammonium hypophosphite, diethylammonium hypophosphite, triethylammonium hypophosphite, tetraethylammonium hypophosphite, tetrabutylphosphonium hypophosphite, tetraphenylphosphonium hypophosphite, and the like.

As the organic solvent in which the hypophosphite compound is dissolved, any solvent in which the hypophosphite can be dissolved and that has a boiling point higher than the processing temperature of the resin is preferably used. Examples of the organic solvent are protic polar solvents such as polyhydric alcohols, preferably those having a molecular weight of not more than 50,000, and polyamines and aprotic polar solvent such as alkylsulfones. Specific examples of the protic solvent are ethylene glycol, diethylene glycol, polyethylene glycol (having a molecular weight of 150 to 50,000), polypropylene glycol (having a molecular weight of 134 to 50,000), glycerin, diglycerin, hexaglycerin, trimethylolpropane, hexamethylenediamine, etc. Specific examples of the aprotic solvent are dimethylsulfoxide and the like.

Examples of the resin to be used in the present invention are olefin polymers such as olefin homopolymers (e.g. polyethylene, polypropylene, poly-1-butene, poly-4-methyl-1-pentene, etc.), olefin copolymers (e.g. ethylenepropylene block copolymer, ethylene-propylene random copolymer, ethylene-1-butene copolymer, ethylene-1-hexene copolymer, ethylene-4-methyl-l-pentene copolymer, ethylene-1-octene copolymer, propylene-1-butene copolymer, etc.), copolymers of an olefin and a polar vinyl compound (e.g. ethylene-vinyl acetate, ethylene-methyl methacrylate copolymer, etc.) and ionomer resins; acrylic resins such as polymethyl methacrylate; polyester resins; polyamide resins; polycarbonate resins; phenol resins; polyvinyl chloride resins; polyurethane resins; and the like.

Amounts of the components contained in the resin composition of the present invention are as follows:

The heat stabilizer is used in an amount of 0.01 to 10 parts by weight, preferably 0.05 to 1 part by weight per 100 parts by weight of the resin. When this amount is less than 0.01 part by weight, the heat stability is not effectively improved. When this amount exceeds 10 parts by weight, the heat stability is not significantly improved and such larger amount is not economical. In addition, the heat stabilizer may unpreferably bleed out or discolor.

The hindered amine base weathering stabilizer is used in an amount of 0.01 to 10 parts by weight per 100 parts by weight of the resin. When this amount is less than 0.01 part by weight, the weather resistance is not effectively improved. When this amount exceeds 10 parts by weight, the weather resistance is not further improved and such larger amount is not economical. In addition, the weathering stabilizer may unpreferably bleed out or discolor.

The added amount of the hypophosphite compound is usually from 0.001 to 100 parts by weight per one part by weight of the hindered amine base weathering stabilizer. When this amount is less than 0.001 part by weight, the heat stability and the weather resistance are not effectively improved. When this amount exceeds 100 parts by weight, the heat stability and the weather resistance are not significantly improved, such larger amount is not economical, and further the solution of the hypophosphite compound tends to bleed out because of an excessive amount of the solution to be added to the resin.

The amount of organic solvent is selected so that 0.01 to 30 parts by weight of the solution containing the hypophosphite compound in an amount of less than a saturation amount is used per 100 parts by weight of the resin. When the amount of the solution is less than 0.01 part by weight, the amount of the hypophosphite compound to be added to the resin is not sufficient so that the heat stability and the weather resistance are not satisfactorily improved. When the amount of the solution exceeds 30 parts by weight, the solution tends to bleed out.

The resin composition of the present invention may contain a UV light absorber, an anti-fogging agent, an anti-static agent, a lubricant, a filler, a flame retardant, a pigment and the like in such amount that the effects of the present invention are not deteriorated.

The compounding manner of the above components is not critical, and the components are compounded by usual means such as with a Banbury mixer, a mixing roll, an extruder and the like.

According to the present invention, by the addition of the solution of the hypophosphite compound in the resin composition containing the heat stabilizer and the hindered amine base weathering stabilizer, the heat stability and the weather resistance of the resin composition are significantly improved.

The resin composition of the present invention is molded in the form of a film, a sheet, fibers or a molded article and is used in various fields such as an agricultural film, an automobile parts material, etc. In particular, the film produced from the resin composition of the present invention comprising, as the resin, a polyolefin such as polyethylene or ethylene-1-butene copolymer, or ethylene-vinyl acetate copolymer is very useful as a wrapping film and a covering material for agricultural green houses or tunnels. The resin composition of the present invention is useful as a material for outdoor use which is required to have high weather resistance such as for automobile parts, for example, a bumper, or construction materials such as a roof of a garage.

PREFERRED EMBODIMENTS OF THE INVENTION

The present invention will be illustrated by the following Examples, which do not limit the scope of the present invention.

The test methods in the Examples are as follows:

Heat stability test

With a test sample of 1 mm in thickness (1 g), an induction period for oxygen absorption is measured by a measurement apparatus for polymer deterioration (manufactured by Shibayama Scientific Co., Ltd.) at a predetermined vessel internal temperature with an oxygen amount of 40 ml in a dark place. The induction period for oxygen absorption is expressed by a time period till the oxygen amount decreases by 0.9 ml or the internal oxygen volume indicates the minimum volume when decomposed gases are generated, after the vessel temperature is stabilized. The longer induction period for oxygen absorption means better resistance to oxidative degradation, namely better heat stability.

Weathering test

A test sample in the form of a JIS No. 3 dumbbell is aged with an Eye Super UV Tester (trademark)

SUV-W 11 (manufactured by Eye Graphics Co., Ltd.) with a luminous energy of 100 mW/cm$^2$, at a distance of 24 cm from a light source, at a blowing air temperature of 60° C. and a relative humidity of 33%. The aged sample is subjected to a tensile test with an Autograph (trademark) DSS 100 (manufactured by Shimadzu Co.) to measure elongation (%) and then the weathering test time at which the elongation decreases to half of the original value (a half value period of weather resistance) is recorded. The larger half value period means better weather resistance.

Various solutions of the hypophosphite compounds are listed in Table 1.

TABLE 1

| Solution No. | Solvent | Hypophosphite compound | Concentration (wt. %) |
|---|---|---|---|
| A | Polyethylene glycol 200[1] | Sodium hypophosphite | 1 |
| B | Polyethylene glycol 200 | Sodium hypophosphite | 3 |
| C | Diethylene glycol | Sodium hypophosphite | 20 |
| D | Polyethylene glycol 400[2] | Sodium hypophosphite | 0.5 |
| E | Glycerin | Sodium hypophosphite | 3 |
| F | Diglycerin | Sodium hypophosphite | 1 |
| G | Polyethylene glycol 200/glycerin (weight ratio of 1/1) | Sodium hypophosphite | 6 |
| H | Diethylene glycol | Potassium hypophosphite | 3 |
| I | Diethylene glycol | Tetramethylammonium hypophosphite | 4 |
| J | Diethylene glycol | Cetyltrimethylammonium hypophosphite | 1 |

Note:
[1] Manufactured by Nakaraitesk Co., Ltd. Molecular weight of 190–210.
[2] Manufactured by Nakaraitesk Co., Ltd. Molecular weight of 380–420.

EXAMPLES 1–4

A resin, a heat stabilizer, a hindered amine base weathering stabilizer and a solution of a hypophosphite compound as shown in Table 2 were compounded and kneaded with a Banbury mixer at 150° C. for 5 minutes. Then, the mixture was granulated with an extruder to produce pellets. The pellets were molded by press molding to form a sheet of 1 mm in thickness or by inflation molding to form a film of 50 μm in thickness, which were subjected to the heat stability test (a vessel internal temperature of 210° C.) and the weathering test, respectively.

The results are shown in Table 2. Each resin composition had good antioxidant properties.

COMPARATIVE EXAMPLES 1–4

In the same manner as in Examples 1–4 but using no solution of a hypophosphite compound, the sheet and the film were molded and subjected to the heat stability test and the weathering test.

The results are shown in Table 2. None of the resin compositions had good antioxidant properties.

TABLE 2

| | Composition | | | | | Antioxidant properties | |
|---|---|---|---|---|---|---|---|
| Example No. | Resin (PBW) | Solution of hypophosphite (PBW) | Additive (PBW) | Heat stabilizer (PBW) | Weathering stabilizer (PBW) | Induction period for oxygen absorbance (min) | Half value period (hrs) |
| 1 | LDPE (100) | A (1) | — | BHT (0.1) | HALS 944 (0.3) | 50 | 150 |
| 2 | LDPE (100) | B (1) | — | BHT (0.1) | HALS 944 (0.3) | 120 | 170 |
| 3 | LDPE (100) | B (0.3) | — | BHT (0.1) | HALS 944 (0.3) | 90 | 150 |
| 4 | LDPE (100) | B (1) | — | 1010 (0.1) | HALS 500 (0.3) | 110 | 170 |
| Com. 1 | LDPE (100) | — | — | BHT (0.1) | HALS 944 (0.3) | 5 | 110 |
| Com. 2 | LDPE (100) | — | Sodium hypophosphite (0.03) | BHT (0.1) | HALS 944 (0.3) | 45 | 140 |
| Com. 3 | LDPE (100) | — | Polyethylene glycol 200 (1.0) | BHT (0.1) | HALS 944 (0.3) | 5 | 110 |
| Com. 4 | LDPE | — | — | 1010 | HALS 500 | 10 | 110 |

TABLE 2-continued

| Example No. | Composition | | | | | Antioxidant properties | |
|---|---|---|---|---|---|---|---|
| | Resin (PBW) | Solution of hypophosphite (PBW) | Additive (PBW) | Heat stabilizer (PBW) | Weathering stabilizer (PBW) | Induction period for oxygen absorbance (min) | Half value period (hrs) |
| | | (100) | | (0.1) | (0.3) | | |

Note:
LDPE: Low density polyethylene (Sumikasen F 208-0 manufactured by Sumitomo Chemical Co., Ltd.)
BHT: Sumilizer BHT (manufactured by Sumitomo Chemical Co., Ltd.)

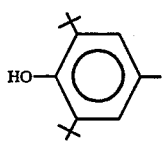

1010: Irganox 1010 (manufactured by Ciba Geigy)

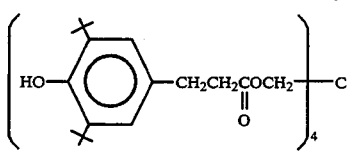

HALS 944: Chimassorb 944 LD (manufactured by Ciba Geigy)

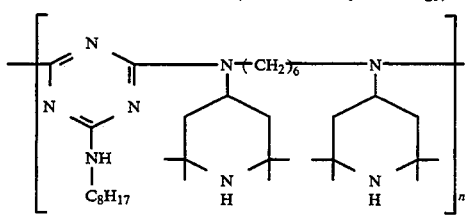

HALS 500: Cyasorb UV 3346 (manufactured by American Cyanamid Company)

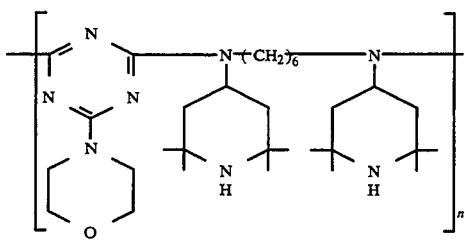

EXAMPLES 5-13

A resin, a heat stabilizer, a hindered amine base weathering stabilizer and a solution of a hypophosphite compound as shown in Table 3 were compounded and kneaded with a Laboplast Mill (manufactured by Toyo Seiki Seisakusho) at 160° C. and 60 rpm for 5 minutes and then press molded to form a sheet of 1 mm in thickness. The sheet was subjected to the heat stability test (a vessel internal temperature of 210° C.).

The results are shown in Table 3. Each resin composition had a good antioxidant property.

COMPARATIVE EXAMPLES 5-9

In the same manner as in Examples 7-12 but using the components shown in Table 3, a sheet was produced and subjected to the heat stability test.

The results are shown in Table 3. None of the resin compositions had a good antioxidant property.

TABLE 3

| Example No. | Composition | | | | | Antioxidant property |
|---|---|---|---|---|---|---|
| | Resin (PBW) | Solution of hypophosphite (PBW) | Additive (PBW) | Heat stabilizer (PBW) | Weathering stabilizer (PBW) | Induction period for oxygen absorbance (min) |
| 5 | EVA (100) | B (1) | — | 1010 (0.1) | HALS 622 (0.3) | 50 |
| 6 | LDPE (100) | C (0.05) | — | BHT (0.1) | HALS 944 (0.3) | 55 |
| 7 | LDPE (100) | D (3) | — | BHT (0.1) | HALS 944 (0.3) | 65 |
| 8 | LDPE (100) | E (1) | — | BHT (0.1) | HALS 944 (0.3) | 80 |
| 9 | LDPE (100) | F (1) | — | BHT (0.1) | HALS 944 (0.3) | 50 |
| 10 | LDPE (100) | G (0.5) | — | BHT (0.1) | HALS 944 (0.3) | 85 |
| 11 | LDPE (100) | H (1) | — | BHT (0.1) | HALS 944 (0.3) | 85 |

TABLE 3-continued

| Example No. | Composition Resin (PBW) | Solution of hypophosphite (PBW) | Additive (PBW) | Heat stabilizer (PBW) | Weathering stabilizer (PBW) | Antioxidant property Induction period for oxygen absorbance (min) |
|---|---|---|---|---|---|---|
| 12 | LDPE (100) | I (1) | — | BHT (0.1) | HALS 944 (0.3) | 80 |
| 13 | LDPE (100) | J (1) | — | BHT (0.1) | HALS 944 (0.3) | 65 |
| Com. 5 | EVA (100) | — | Polyethylene glycol 200 (1.0) | 1010 (0.1) | HALS 622 (0.3) | 22 |
| Com. 6 | LDPE (100) | — | Diethylene glycol (0.05) | BHT (0.1) | HALS 944 (0.3) | 5 |
| Com. 7 | LDPE (100) | — | PEG 400 (3.0) | BHT (0.1) | HALS 944 (0.3) | 10 |
| Com. 8 | LDPE (100) | — | Glycerin (1.0) | BHT (0.1) | HALS 944 (0.3) | 5 |
| Com. 9 | LDPE (100) | — | Diglycerin (1.0) | BHT (0.1) | HALS 944 (0.3) | 5 |

Note:
EVA: Ethylene-vinyl acetate copolymer (Evatate H 2020 manufactured by Sumitomo Chemical Co., Ltd.
PEG 400: Polyethylene glycol 400 (manufactured by Nakaraitesk, molecular weight: 380–420).
LDPE, BHT, HALS 944 and 1010: See Note for Table 2.
HALS 622: Tinuvin (trademark) 622 LD (manufactured by Ciba Geigy).

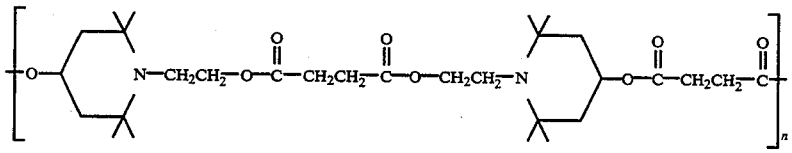

EXAMPLE 14

A resin, a heat stabilizer, a hindered amine base weathering stabilizer, an anti-fogging agent and a solution of a hypophosphite compound as shown in Table 4 were compounded and kneaded with a Banbury mixer at 150° C. for 5 minutes and then granulated by an extruder to produce pellets. The pellets were molded by inflation molding to form a film having a thickness of 75 μm. The film was subjected to the weathering test.

The results are shown in Table 4. The resin composition had a good antioxidant property.

COMPARATIVE EXAMPLE 10

In the same manner as in Example 14 but using the components shown in Table 4, a film was produced and subjected to the weathering test.

The results are shown in Table 4. The resin compositions had a poor antioxidant property.

TABLE 4

| Example No. | Composition Resin (PBW) | Solution of hypophosphite (PBW) | Anti-fogging agent (PBW) | Heat stabilizer (PBW) | Weathering stabilizer (PBW) | Antioxidant property Weathering test Half value period (hrs) |
|---|---|---|---|---|---|---|
| 14 | EVA (100) | B (1) | Sorbitan palmitate (2.0) | BHT (0.2) | HALS 944 (0.4) | 140 |
| Com. 10 | EVA (100) | — | Sorbitan palmitate (2.0) | BHT (0.2) | HALS 944 (0.4) | 70 |

Note:
EVA: Ethylene-vinyl acetate copolymer (Evatate manufactured by Sumitomo Chemical Co., Ltd.).
BHT and HALS 944: See Note for Table 2.

What is claimed is:

1. A highly antioxidant resin composition, comprising an olefin polymer, a solution of a hypophosphite compound in an organic solvent selected from the group consisting of a polyhydric alcohol having a weight average molecular number of not more than 50,000, a polyamine, and an aprotic polar solvent, a heat stabilizer selected from the group consisting of a compound having a 2,6-dialkylphenol moiety, a compound having a 2-alkylphenol moiety, a sulfur-containing compound having a thiol or thioether linkage containing a divalent sulfur atom, and a compound having a phosphite ester linkage containing a trivalent phosphorus atom, and a hindered amine base weathering stabilizer.

2. The highly antioxidant resin composition according to claim 1, wherein said hypophosphite compound is at least one member selected from the group consisting of lithium hypophosphite, sodium hypophosphite, potassium hypophosphite, magnesium hypophosphite, calcium hypophosphite, zinc hypophosphite, titanium hypophosphite, vanadium hypophosphite, molybdenum hypophosphite, manganese hypophosphite, cobalt hypophosphite, ammonium hypophosphite, butylammonium hypophosphite, diethylammonium hypophosphite, triethylammonium hypophosphite, tetraethylammonium hypophosphite, tetrabutylphosphonium hypophosphite and tetraphenylphosphonium hypophosphite.

3. The highly antioxidant resin composition according to claim 1, wherein said hindered amine base weathering stabilizer is a compound having a 2,2,6,6-tetraalkylpiperidine moiety.

4. The highly antioxidant resin composition according to claim 1, wherein said hypophosphite compound has the following formula:

$$X_a(H_2PO_2)_b$$

wherein X is a metal ion, an ammonium ion or a quaternary phosphonium ion, and a and b are positive numbers provided that they satisfy the equation a×c=b in which c is the valency of X.

5. The highly antioxidant resin composition according to claim 1, wherein said organic solvent is a polyhydric alcohol having a weight average molecular number of not more than 50,000.

6. The highly antioxidant resin composition according to claim 1, wherein said organic solvent is a polyamine.

7. The highly antioxidant resin composition according to claim 1, wherein said organic solvent is an aprotic polar solvent selected from the group consisting of an alkylsulfone and dimethylsulfoxide.

8. The highly antioxidant resin composition according to claim 1, wherein said heat stabilizer is present in said composition in an amount of 0.01 to 10 parts by weight per 100 parts by weight of said resin, and said hindered amine based weathering stabilizer is present in said composition in an amount of 0.01 to 10 parts by weight per 100 parts by weight of said resin.

9. The highly antioxidant resin composition according to claim 8, wherein the amount of hypophosphite compound present in said composition is from 0.001 to 100 parts by weight per one part by weight of said hindered amine base weathering stabilizer.

10. The highly antioxidant resin composition according to claim 1, wherein said heat stabilizer is a hindered phenol selected from the group consisting of

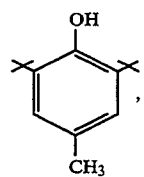,

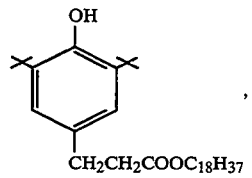

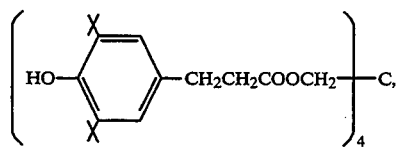

-continued

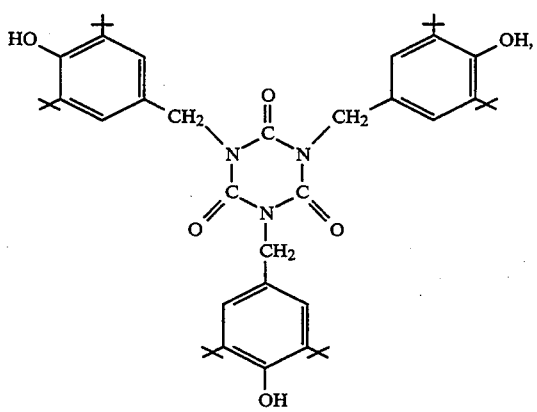

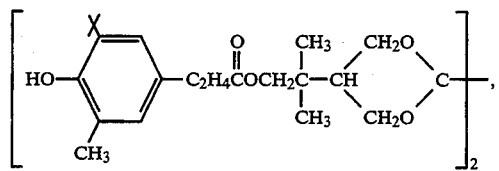,

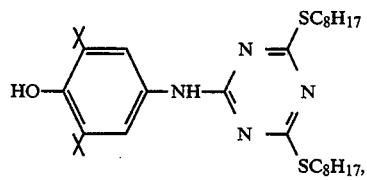

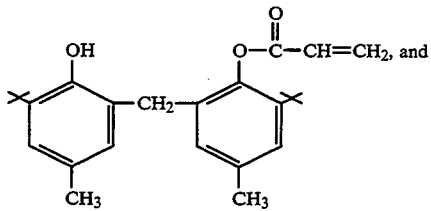, and

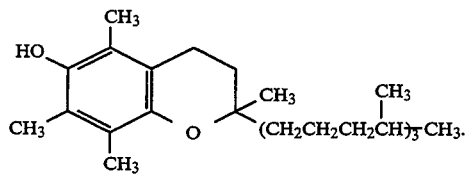.

11. The highly antioxidant resin composition according to claim 1, wherein said sulfur-containing compound is a member selected from the group consisting of

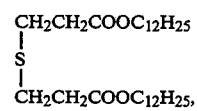,

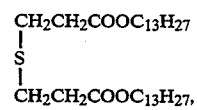,

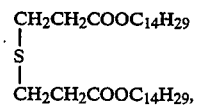,

-continued

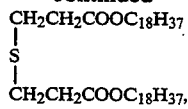

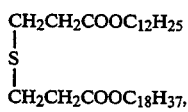

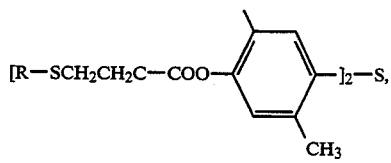

wherein R is an alkyl group having 12, 13 or 14 carbon atoms, and

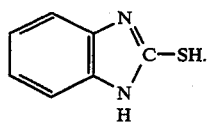

12. The highly antioxidant resin composition according to claim 1, wherein said compound having a phosphite ester linkage containing a trivalent phosphorus atom is a member selected from the group consisting of

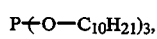

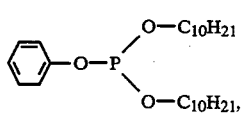

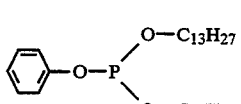

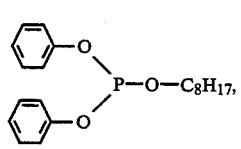

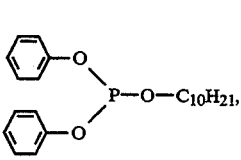

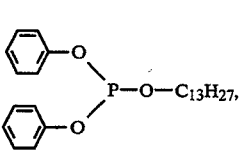

-continued

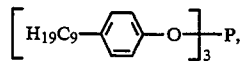

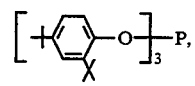

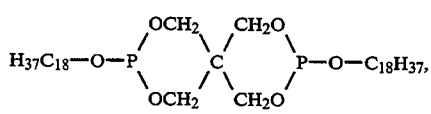

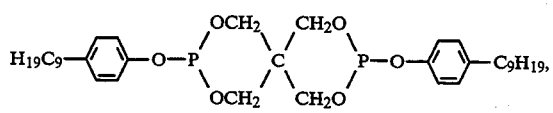

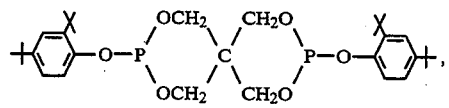

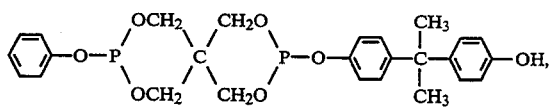

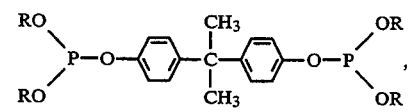

wherein R is an alkyl group having 12 through 15 carbon atoms

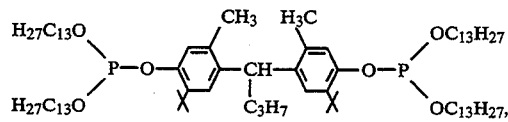

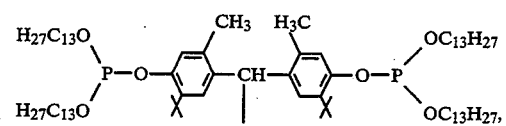

and

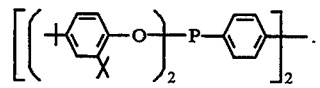

13. The highly antioxidant resin composition according to claim 3, wherein said compound having a 2,2,6,6-tetraalkylpiperidine moiety possesses a substituent at the 4-position, and a molecular weight of at least 250.

14. The highly antioxidant resin composition according to claim 13, wherein said substituent at said 4-position is a member selected from the group consisting of a carboxylic acid residue, an alkoxy group, and an alkylamino group.

15. The highly antioxidant resin composition according to claim 13, wherein the N-position of said compound having a 2,2,6,6-tetraalkylpiperidine moiety is substituted with an alkyl group.

16. The highly antioxidant resin composition according to claim 1, wherein said hindered amine base weathering stabilizer is a compound selected from the group consisting of

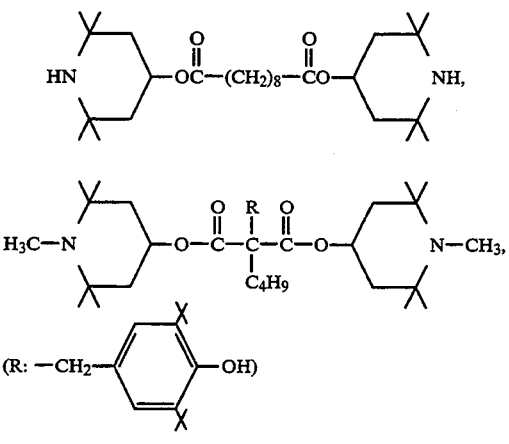

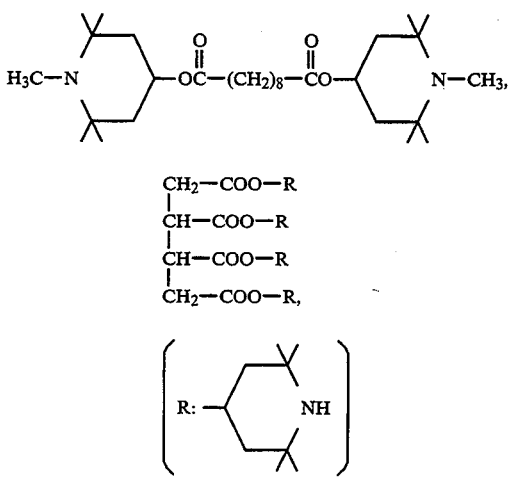

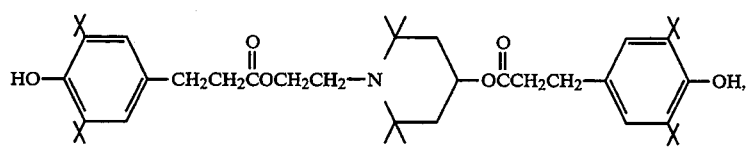

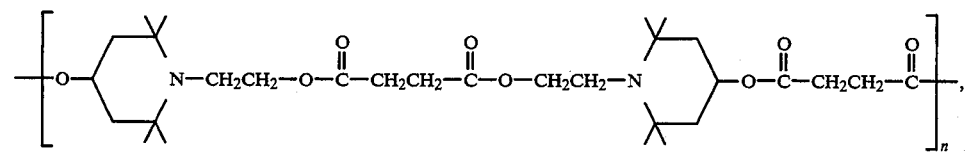

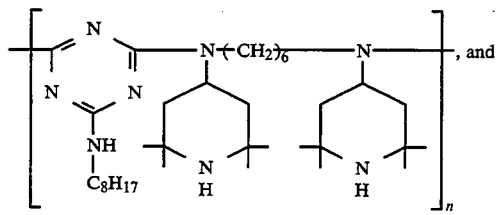 , and 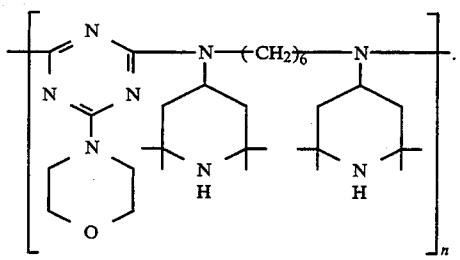

17. The highly antioxidant resin composition according to claim 1, wherein said olefin polymer is a member selected from the group consisting of an olefin homopolymer, an olefin copolymer, and a copolymer of an olefin and a polar vinyl compound.

18. The highly antioxidant resin composition according to claim 17, wherein said olefin homopolymer is a member selected from the group consisting of polyethylene, polypropylene, poly-1-butene, and poly-4-methyl-1-pentene.

19. The highly antioxidant resin composition according to claim 17, wherein said olefin copolymer is a member selected from the group consisting of ethylene-propylene block copolymer, ethylene-propylene random copolymer, ethylene-1-butene copolymer, ethylene-1-hexene copolymer, ethylene-4-methyl-1-pentene copolymer, ethylene-1-octene copolymer, and propylene-1-butene copolymer.

20. The highly antioxidant resin composition according to claim 17, wherein said copolymer of an olefin and a polar vinyl compound is a member selected from the group consisting of ethylene-vinyl acetate and ethylene-methyl methacrylate copolymer.

21. The highly antioxidant resin composition according to claim 8, wherein said heat stabilizer is present in said composition in an amount of 0.05 to 1 part by weight per 100 parts by weight of said resin.

22. The highly antioxidant resin composition according to claim 1, wherein the amount of organic solvent is such that 0.01 to 30 parts by weight of the solution containing said hypophosphite compound in an amount less than a saturating amount is employed per 100 parts by weight of said resin.

23. The highly antioxidant resin composition according to claim 1, wherein said resin composition further comprises a member selected from the group consisting of a UV light absorber, an anti-fogging agent, an antistatic agent, a lubricant, a filler, a flame retardant, and a pigment.

24. The highly antioxidant resin composition according to claim 1, wherein said resin composition is molded in the form of a film, a sheet, fibers, or a molded article.

25. The highly antioxidant resin composition according to claim 24, wherein said molded article is an automobile part or a construction material.

26. The highly antioxidant resin composition according to claim 25, wherein said automobile part is a bumper.

27. The highly antioxidant resin composition according to claim 24, wherein said construction material is a roof of a garage.

28. The highly antioxidant resin composition according to claim 18, wherein said olefin homopolymer is low density polyethylene.

29. The highly antioxidant resin composition according to claim 20, wherein said copolymer of an olefin and a polar vinyl compound is ethylene-vinyl acetate copolymer.

* * * * *